Nov. 5, 1957    D. DORRIS ET AL    2,812,054
CONVEYOR DRIVE ASSEMBLY
Filed April 30, 1954

INVENTORS
DUNCAN DORRIS
GEORGE P. DORRIS, JR.
BY Terry & Cohn
ATTORNEYS.

United States Patent Office 2,812,054
Patented Nov. 5, 1957

2,812,054

CONVEYOR DRIVE ASSEMBLY

Duncan Dorris and George P. Dorris, Jr., St. Louis, Mo.

Application April 30, 1954, Serial No. 426,756

3 Claims. (Cl. 198—213)

This invention relates to improvements in a conveyor drive assembly, and more particularly to improvements in the structural arrangement and mounting of a speed reduction driving means with a screw conveyor.

It has heretofore been customary in connection with a gear reduction driving means for screw conveyors to mount the reduction unit on an extension of the screw conveyor shaft, such that the gear assembly is supported directly by that shaft. In such conventional assemblies, a front end bearing for the conveyor shaft is carried by the front end plate of the conveyor trough. It is the principal object of the present improvements to provide an assembly for mounting and connecting a reducer unit to a screw conveyor which eliminates the need for a separate drive shaft ordinarily connected with the conveyor screw, and eliminates the need for the thrust bearing and associated seals customarily mounted on the end plate of the trough to journal the end of the conveyor screw.

Another important objective is realized in an improved construction and structural arrangement that furnishes a compact, space-saving assembly of the power means, gear reducer and screw conveyor.

Still another important object of the invention is realized in the connection and mounting of a reducer unit to a plate adapted for attachment to the end of a trough, which permits rotational adjustment of the reducer assembly about the axis of an output shaft, whereby to effect tensioning adjustment of a flexible driving means such as a drive belt. Of further advantage, the particular improved assembly supports the conveyor shaft on bearings provided in the reducer unit to journal the output shaft.

The foregoing and numerous other objects and advantages of the invention will more clearly appear from the following detailed description of a preferred embodiment, particularly when considered in connection with the accompanying drawing, in which.

Figure 1:
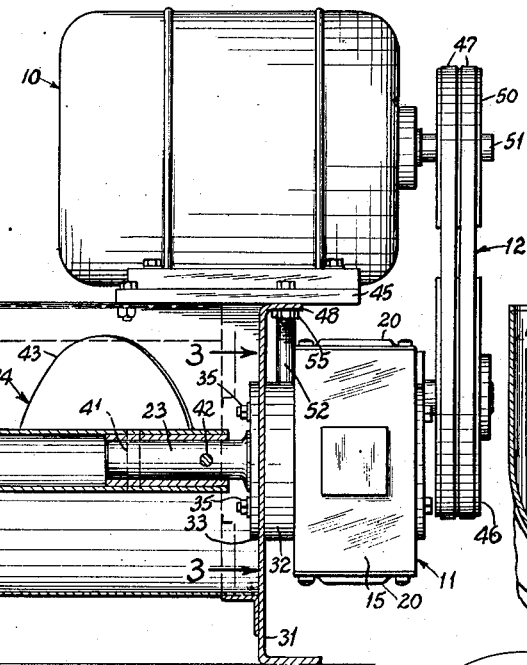
Fig. 1 is a side elevational view, partly in cross section, showing the assembly of the motor, reduction unit, trough and conveyor shaft.
Figure 3:
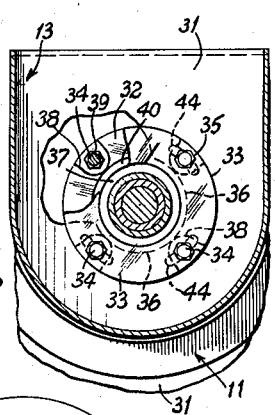
Figure 4:
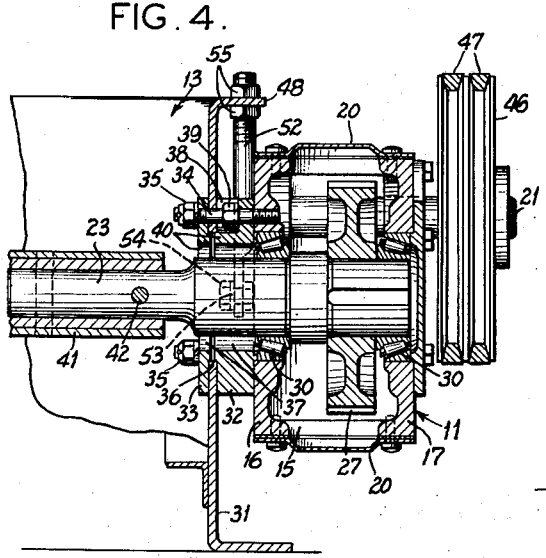
Figure 2:
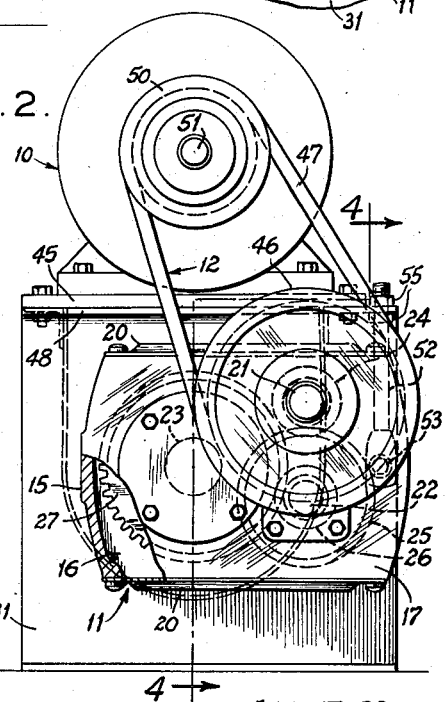
Fig. 2 is an end view of the conveyor assembly of Fig. 1.

Fig. 3 is a fragmentary cross sectional view, having cutaway portions, showing the mounting of the reducer unit to the trough plate, as seen along line 3—3 of Fig. 1, and Fig. 4 is a fragmentary view, taken in cross section along staggered line 4—4 of Fig. 2, the gears on the input and the intermediate shafts of the reducer unit being omitted for purpose of clearly illustrating the mounting of the output shaft.

Referring now by characters of reference to the drawing, and first to Fig. 1, it is noted that motor 10 constituting the power means is operatively connected to a speed reducer unit referred to at 11 through a flexible drive means such as a belt-and-pulley arrangement indicated at 12. The reducer unit 11 is mounted on a trough generally designated at 13 that contains a screw feeding means shown at 14.

More particularly, the reducer unit 11 includes a housing 15 having spaced front and rear portions 16 and 17 respectively (Fig. 4). Upper and lower panels 20 are detachably secured to housing 15, and afford easy and ready access to the internal gearing.

Mounted internally of housing 15 and on portions 16 and 17 is a high speed input shaft 21 (Fig. 4) and an intermediate shaft 22 (Fig. 2). Also mounted in housing 15, but offset from a horizontal plane passed through the axis of input shaft 21 is a low speed output shaft 23. The input shaft 21 is operatively connected by gearing to output shaft 23. The two stage step down gearing arrangement is perhaps best shown in Fig. 2, and includes a pinion 24 of input shaft 21 enmeshing larger gear 25 of intermediate shaft 22. A smaller gear 26 on intermediate shaft 22 then engages a relatively large gear 27 on output shaft 23. Only gear 27 on shaft 23 is shown in Fig. 4 in order to provide a clear illustration of the mounting of output shaft 23.

A pair of thrust bearings 30 shown in Fig. 4 are provided in housing 15, one of which is carried by front portion 16 and the other by rear portion 17, the bearings 30 serving to journal output shaft 23. These thrust bearings 30 are relatively reversely arranged within housing 15 so as to take the thrust of output shaft 23 in either direction of its rotation.

From Fig. 4 it is seen that the reducer unit 11 is mounted on a plate 31 normally attached to the end of the trough 13. An annular plate 32 and a coacting annular plate 33 are arranged respectively on the outer and inner sides of trough end plate 31, and serve to mount the housing 15 to end plate 31. A plurality of bolts 34 constituting connectors or connecting elements are threadedly secured to housing 15, and extend through coacting plates 32 and 33 and end plate 31. A nut 35 is threaded on each bolt 34, and is adapted to clamp end plate 31 between plates 32 and 33, and to mount housing 15. Movable plate 32 is provided with recesses 38 along its periphery and in the region of bolts 34. A bolt head 39 is fixed to bolt 34 and is located in each recess 38. Thus, it is apparent that plate 32 may be fastened to housing 15 by head 39. Nuts 35 provide an independent adjustment.

The end plate 31 of trough 13 is provided with a circular aperture 36 (Figs. 3 and 4). Each of plates 32 and 33 is provided with an opening 37 (Fig. 3) in register with aperture 36, and is provided with an annular collar portion 40 best viewed in Fig. 4, that is received in and slidably engages the periphery of aperture 36. Oil and dust seals may be provided in openings 37 and around shaft 23. These elements are not shown in Fig. 4 in order to show clearly that shaft 23 is not journalled in plate 31.

The output shaft 23 extends outwardly of housing 15, extends freely through openings 37 and through aperture 36, and thence extends into the interior of trough 13. As is seen from Figs. 1 and 4, the inner end of output shaft 23 is reduced in diameter, and is received in the hollow end of conveyor shaft 41, the shaft 41 being arranged in coaxial alignment with output shaft 23. Transverse pins 42 are utilized to connect shafts 23 and 41. A screw impeller 43 (Fig. 1) is carried by shaft 41 and operates to convey material along trough 13.

As is more clearly shown in Fig. 3, the end plate 31 is provided with a plurality of arcuate slots 44 through which bolts 34 extend. These slots 44 are of sufficient dimension to permit translatory, shifting movement of bolts 34 therein, and hence to permit rotative movement of housing 15 about the axis of output shaft 23. The nuts 35 are used to vary the degree of clamping, and hence the friction pressure exerted by the annular plates 32 and 33 on intervening trough end plate 31 may be regulated. Slippage occurs between the contacting and contiguous surfaces of cooperating plates 31, 32 and 33 when housing 15 is angularly adjusted.

A mounting plate 45 shown in Figs. 1 and 2, is horizontally disposed on and secured to the top of trough 13 and to flange 48 of end plate 31. The motor 10 is seated on mounting plate 45, immediately above reducer unit 11. The input shaft 21 extends outwardly of housing 15, and is provided with a pulley 46 (Fig. 1). Belts 47 connect pulley 46 with pulley 50 keyed to shaft 51 of motor 10.

Belt adjustment is accomplished by means of an adjustable torque-arm 52 viewed in Fig. 4, pivotally joined at its lower end by a pin 53 to a lug 54 projecting from the end of the housing 15. The upper end of arm 52 extends through an aperture provided in a flange 48 of plate 31, and is adapted to be adjusted upwardly or downwardly by a pair of nuts 55 located above and below flange 48. Thus, lengthwise adjustment of arm 52 will cause angular or rotational movement of housing 15 and its associated parts about the axis of output shaft 23, and hence effect tensioning adjustment of drive belts 47.

Although the operation of the assembly will have become apparent from the foregoing description of its elements and their relation, it may be noted for completeness of disclosure that nuts 35 are tightened on bolts 34 to mount securely reducer unit 11 on end plate 31, and yet the frictional pressure between plates 32, 33 and intervening end plate 31 is of a magnitude to permit movement of bolts 34 in slots 44, and hence permit angular movement of housing 15 incident to adjustment of torque-arm 52.

Although the invention has been described by particularized reference to a single advanced embodiment of the present improvements, the detail of description should be understood as illustrative rather than limiting, inasmuch as numerous variants are possible within the full intended scope of the claims hereunto appended.

We claim as our invention:

1. In a conveyor assembly, a trough, a conveyor shaft in said trough, a reducer housing, an input and an output shaft carried by said housing, gearing interconnecting said input and said output shafts, thrust bearings on said housing for journalling said output shaft, a trough plate on the end of said trough, said trough plate being provided with a circular aperture, a plate element disposed on each side of said trough plate, said plate elements being provided with openings in register with said aperture, at least one of said plate elements being provided with a collar portion adapted slidably to engage the periphery of said aperture, the output shaft extending freely through said openings and said aperture, and into said trough, the output shaft being connected to said conveyor shaft, connectors fastened to said housing, said trough plate being provided with a plurality of slots, said connectors extending through said plate elements and through the slots in said trough plate, clamping means on said connectors for mounting the housing to said trough plate, and for regulating the frictional pressure between the plate elements and the intervening trough plate, said slots being of a size to enable rotative adjustment of said housing about the axis of said output shaft.

2. In a conveyor assembly, a trough, a conveyor shaft, a reducer unit including a housing, an input and an output shaft journalled in said housing, said output shaft being offset from said input shaft, gearing interconnecting said input and said output shaft, a pair of thrust bearings within said housing journalling said output shaft, a trough plate on the end of said trough, said trough plate being provided with an aperture, a pair of movable plates one of which is on each side of said trough plate, said movable plates being provided with openings in register with said aperture, a plurality of connecting elements threadedly attached to said housing, said connecting elements extending through said movable plates and through said intervening trough plate, a cooperating threaded clamping member on each connecting element adapted to mount the housing to said trough plate, and adapted to regulate the frictional pressure between the movable plates and said trough plate, the trough plate being provided with a plurality of arcuate slots adapted to receive the connecting elements, the output shaft extending freely through said aperture in the trough plate and through said openings in said movable plates, the output shaft being connected to said conveyor shaft, the slots being of sufficient size to permit arcuate movement of said connecting elements therein, and hence realize rotative movement of said housing and said movable plates about the axis of said output shaft, and a torque-arm connected to said housing for adjustably regulating the angular relation of said housing.

3. In a conveyor assembly, a trough, a feeding screw having a conveyor shaft, a speed reducer unit including a housing, an input and an output shaft journalled in said housing, power means including a belt for driving said input shaft, said output shaft being offset from said input shaft, gearing interconnecting said input and said output shaft, a pair of thrust bearings within said housing and reversely arranged to absorb the thrust of the output shaft in either direction of its rotation, said bearings journalling said output shaft, a trough plate on the end of said trough, said trough plate being provided with a circular aperture, a pair of movable plates, one of which being disposed on each side of said trough plate, said movable plates being provided with openings in register with said aperture, said movable plates having collar portions that fit internally of said aperture and slidably engage the periphery thereof, a plurality of bolts threadedly attached to said housing, said bolts extending through said movable plates and through said intervening trough plate, a cooperating clamping nut on each bolt adapted to mount the housing to said trough plate, and to regulate the frictional pressure between the plates, the trough plate being provided with a plurality of arcuate slots adapted to receive the bolts, the output shaft extending freely through said aperture in the trough plate, through said opening in the movable plates, and extending into said trough, the output shaft being connected to said conveyor shaft, the slots being of sufficient size to permit arcuate movement of said bolts, and hence realize rotative movement of said housing and movable plates about the axis of said output shaft, and a torque-arm connected to said housing, said arm including a threaded adjustment for regulating the angular relation of said housing to effect tensioning of the drive belt.

References Cited in the file of this patent

UNITED STATES PATENTS

| | | |
|---|---|---|
| 1,425,604 | Nelson | Aug. 15, 1922 |
| 2,266,945 | Abraham | Dec. 23, 1941 |
| 2,751,798 | Keese et al. | June 26, 1956 |